United States Patent [19]

McShane

[11] Patent Number: 5,295,120
[45] Date of Patent: Mar. 15, 1994

[54] HERMETICALLY SEALED ULTRASONIC TRANSDUCER SYSTEM

[75] Inventor: James L. McShane, Churchill Boro, Pa.

[73] Assignee: Westinghouse Electric Corp., Pittsburgh, Pa.

[21] Appl. No.: 676,059

[22] Filed: Mar. 27, 1991

Related U.S. Application Data

[63] Continuation-in-part of Ser. No. 633,917, Dec. 26, 1990, abandoned.

[51] Int. Cl.$^5$ .................... G01S 15/08; H04R 1/00
[52] U.S. Cl. ................................. 367/188; 367/908
[58] Field of Search ............... 367/908, 99, 162, 176, 367/188; 181/124; 340/621; 73/290 V, 592; 310/327, 349, 355

[56] References Cited

U.S. PATENT DOCUMENTS

| | | | |
|---|---|---|---|
| 2,707,755 | 5/1955 | Hardie et al. | 367/1 |
| 3,137,897 | 6/1964 | Coyle | 367/162 |
| 3,771,117 | 11/1973 | Shaffer et al. | |
| 3,890,423 | 6/1975 | Zacharias, Jr. | 310/8.3 |
| 3,952,692 | 12/1975 | Leschek et al. | 310/8.7 |
| 4,069,433 | 1/1978 | McShane | 310/325 |
| 4,126,514 | 11/1978 | Wonn | 176/19 LD |
| 4,162,111 | 7/1979 | Brown | 310/326 |
| 4,193,291 | 3/1980 | Lynnworth | 73/592 |
| 4,297,607 | 10/1981 | Lynnworth et al. | 310/334 |
| 4,649,754 | 3/1987 | Zacharias | 310/334 |

FOREIGN PATENT DOCUMENTS

57-173299(A) 10/1982 Japan.

Primary Examiner—Daniel T. Pihulic
Attorney, Agent, or Firm—J. C. Valentine

[57] ABSTRACT

There is provided a hermetically sealed dry-coupled transducer apparatus and system adapted for improved measuring of liquid level in a pipe or vessel, or for other instrumentation applications. The transducer system is characterized by having a hermetic seal at the junction of an acoustic window 33' and an outer shell 31' (thereby hermetically sealing a forward aperture of the outer shell), and a thin, compliant, threaded cap 46 enclosing a rearward aperture of the outer shell. The cap provides means for repetitively assembling and disassembling the transducer module, if necessary, prior to welding. In addition, a push rod applies acoustic coupling force to a piezoelectric transducer element to effect dry coupling to a surface, while the compliant cap prevents significant force transmission to the shell. The system exhibits limited reverberation and, moreover, is suitable for use in high-temperature environments.

9 Claims, 6 Drawing Sheets

HERMETICALLY SEALED ULTRASONIC TRANSDUCER SYSTEM

BACKGROUND OF THE INVENTION

This is a continuation-in-part of application Ser. No. 633,917, filed Dec. 26, 1990 now abandoned.

This invention generally relates to ultrasonic transducers, and more particularly relates to transducers mounted for the detection of liquid level in a liquid-carrying element such as a coolant pipe in a nuclear power plant. Still more particularly, this invention relates to an improvement of the apparatus described in patent application Ser. No. 633,917, the improvement being that the transducer module is hermetically sealed in a way that maintains the compliance needed for good acoustic coupling to the pipe or other structure. The invention also maintains the device's ability to minimize reverberations.

This invention is directed primarily to ultrasonic pulse operation for reliable distance measurement, such as the ultrasonic level measuring system (ULMS) of the assignee of this application. For accurate time measurement in such a system, a pulse that has a leading edge with a fast rise time is used, so that the return signal can be unambiguously detected. However, in pulse-echo applications such as the ULMS, where the transducer is used for both transmitting and receiving, reverberation can be a substantial problem. Reverberation, at times referred to as ringing, is the residual effect following the relatively large transmit pulse. As is well known, if the reverberation is still present when the echo returns, the echo can be substantially masked, making accurate detection difficult. Preferably, the reverberation should decay rapidly so that it is negligible when the signal returns, resulting in a high signal to noise ratio.

Dry-coupled transducers have been used successfully for liquid level measurement and other purposes. See U.S. Pat. Nos. 3,925,692 and 4,069,433, assigned to the same assignee as this application. In a dry-coupled system, means are provided for avoiding temperature-limiting bonding and coupling agents in typical use, thereby providing very good high temperature capability. For example, in the often very harsh nuclear power plant environment, a key feature of the ultrasonic level measuring system, intended for use during plant outages, is that the transducer can remain on the pipe during plant operation, when the temperature reaches 650° F. (343.3° C.), and continue to operate reliably. The coupling is achieved by the use of coupling surfaces which are extremely flat and smooth, providing intimate and uniform mechanical contact. Good coupling further requires the use of fairly large forces, e.g., in the range of several hundred pounds (about 100 kg). However, a problem inherent in the dry-coupling method is that rearward-propagating waves cannot be avoided when a flat solid member is used in a typical fashion to apply a strong compressive force to the rear surface of the transducer element, such as a piezoelectric disc. Since commonly used acoustic absorbing materials such as filled epoxies are not suitable for long term high temperature use, it has been difficult to acoustically isolate the force-applying or backing members, resulting in reverberation which is sensed by the transducer element. In other words, the rearwardly proceeding waves reach interfaces in the force-applying or backing means which cause internal reflections, which reflections produce significant electrical noise or masking which makes accurate detection difficult. There is an additional problem raised by the harsh nuclear power plant environment—hermetically sealing the system without significantly increasing its mass nd stiffness, and thereby aggravating the reverberation problem, as well as the coupling problem.

In view of the above, there is an important need for an improved, hermetically sealed dry-coupled acoustic transducer system. While electronic sophistication can compensate to a certain extent for the presence of reverberation and noise, it remains clear that pick up of clearly defined signals by the transducer is the most critical function in the operation of the ultrasonic liquid level measuring system. In the ultrasonic level measurement system as manufactured by the assignee of this application, a primary application area involves mounting the transducer on the bottom of a large main coolant pipe in a nuclear power plant. In this application, the measured quantity is water level in the pipe, which in turn is a determinant of reactor conditions during maintenance operations when water is being circulated at low flow rates for residual heat removal. In existing nuclear power plant systems, the coolant pipes are fabricated generally from one of two kinds of stainless steel, centrifugally cast or forged. The cast material attenuates ultrasonic waves to a much greater extent than the forged material, and as a result in the cast pipe the received echo is relatively small and the internal reverberation in the transducer is accordingly relatively large. Such internal reverberation tends to interfere with the accurate detection of the echo. It is noted that scattering from discontinuities in the pipe material may be another source of reverberation. In this environment, it is commercially important to solve this outstanding problem, particularly for measurement systems adapted for cast-pipe plants. This is a lesser problem with plants having forged pipes, but nonetheless further reduction of reverberation is highly desirable. Carbon steel pipes, internally clad with stainless steel or a similar material, are also used. Their acoustic properties are similar to those of forged stainless steel pipes. To account partially for the material property differences, transducers for cast pipe have larger diameter, lower frequency piezoelectric elements than are used for forged or carbon steel pipe, and the transducers are correspondingly larger in overall diameter.

The above-mentioned application Ser. No. 633,917 discloses a dry-coupled ultrasonic transducer module that substantially reduces the acoustic coupling between the transducer element and backing means (and thereby greatly mitigates the reverberation problem); however, there still remains the problem of effectively protecting the module against the harsh environment in which it will typically be used, while at the same time ensuring that the module remains compliant to the force used to maintain good acoustic coupling between the transducer and surface on which it is installed. This latter problem is the focus of the present invention.

SUMMARY OF THE INVENTION

Accordingly, an object of the present invention is to provide a hermetically sealed, dry-coupled ultrasonic transducer arrangement for liquid level measurement in pipes and the like. Another object of the invention is to provide a dry-coupled ultrasonic transducer system, particularly for measuring water level in pipes and other liquid carrying elements, wherein the backing structure for coupling the transducer to the pipe or vessel is designed to approach an air-backed condition (so as to minimize rearward acoustic transmission and resultant reverberation which can mask efficient recognition of return echoes), while also providing a hermetically sealed structure that protects the unit's internal parts without sacrificing the compliance necessary to allow external coupling force to be applied through internal parts to the mounting surface of the pipe. A still further object of the invention is to provide a hermetically sealed ultrasonic transducer system capable of characterizing objects having solid surfaces.

In accordance with the foregoing objects, a hermetically sealed, dry-coupled transducer system comprises a shell having at least a forward aperture, an acoustic window covering and forming a hermetic seal over the forward aperture, a transducer element (e.g., of piezoelectric or electrostrictive material) disposed inside the shell adjacent the acoustic window, coupling means for dry-coupling the transducer to the container and having a force means rearward of the transducer element to apply a force to the back surface of the transducer element, and insert means positioned adjacent to the transducer element's back surface and in compressive contact with the force means for blocking acoustic transmissions from the transducer element in a rearward direction.

In a preferred embodiment of the invention, the insert means includes at least one disc having a plurality of spaced air gaps and positioned to transmit a force to the back surface of the transducer element. As in the preferred embodiment, hermetic sealing may be accomplished by welding, brazing, or soldering at locations A, B and C of FIG. 3; i.e., between window 33' and shell 31, between cap 46' and shell 31, and between cap 46' and push rod 40'. The thin center flange of the window 33' provides compliance in the face of the greater coupling force needed to be exerted on the transducer element 32 due to welding, brazing or soldering at A, B and C; the thin flange also provides limited acoustic coupling to the shell, thus limiting a major source of reverberation.

In a more preferred embodiment, the shell further includes a rearward aperture and the force means includes a push rod. A thin, compliant, threaded cap forms a hermetic seal over the rearward aperture. In addition, the acoustic window includes a thin, flange-like periphery metallically joined to the shell, the thin periphery providing compliance to the window when the transducer element is installed in the shell (as mentioned above, the thin flange also provides limited acoustic coupling to the shell, thus limiting a major source of reverberation). Moreover, the coupling means further includes an insulating spacer situated between the push rod and the insert means. The insulating spacer has an outer diameter approximately equal to the inner diameter of the shell, and the insert means, transducer element, and push rod each have an outer diameter smaller than the inner diameter of the shell. Threads on the cap and shell provide means for repetitive assembling and disassembling of the transducer before welding, if necessary.

A nuclear power plant in accordance with the invention includes at least one liquid-carrying container and, mounted on the container, apparatus as described above for measuring the liquid level inside the container.

An ultrasonic transducer system capable of characterizing objects having solid surfaces comprises a shell having at least a forward aperture, an acoustic window covering and forming a hermetic seal of the forward aperture, a transducer element having front and back surfaces and positioned to transmit acoustic waves from the front surface, through the acoustic window, to the surface of an object having a solid surface, and to receive reflections back from the surface of the object, and means for hermetically sealing the transducer element inside the shell while maintaining sufficient compliance in the shell and acoustic window to maintain reverberations below a prescribed level. Characteristics of the reflections are indicative of (i.e., can be correlated to) a condition of the object.

DESCRIPTION OF THE PREFERRED EMBODIMENTS

Figure 1:
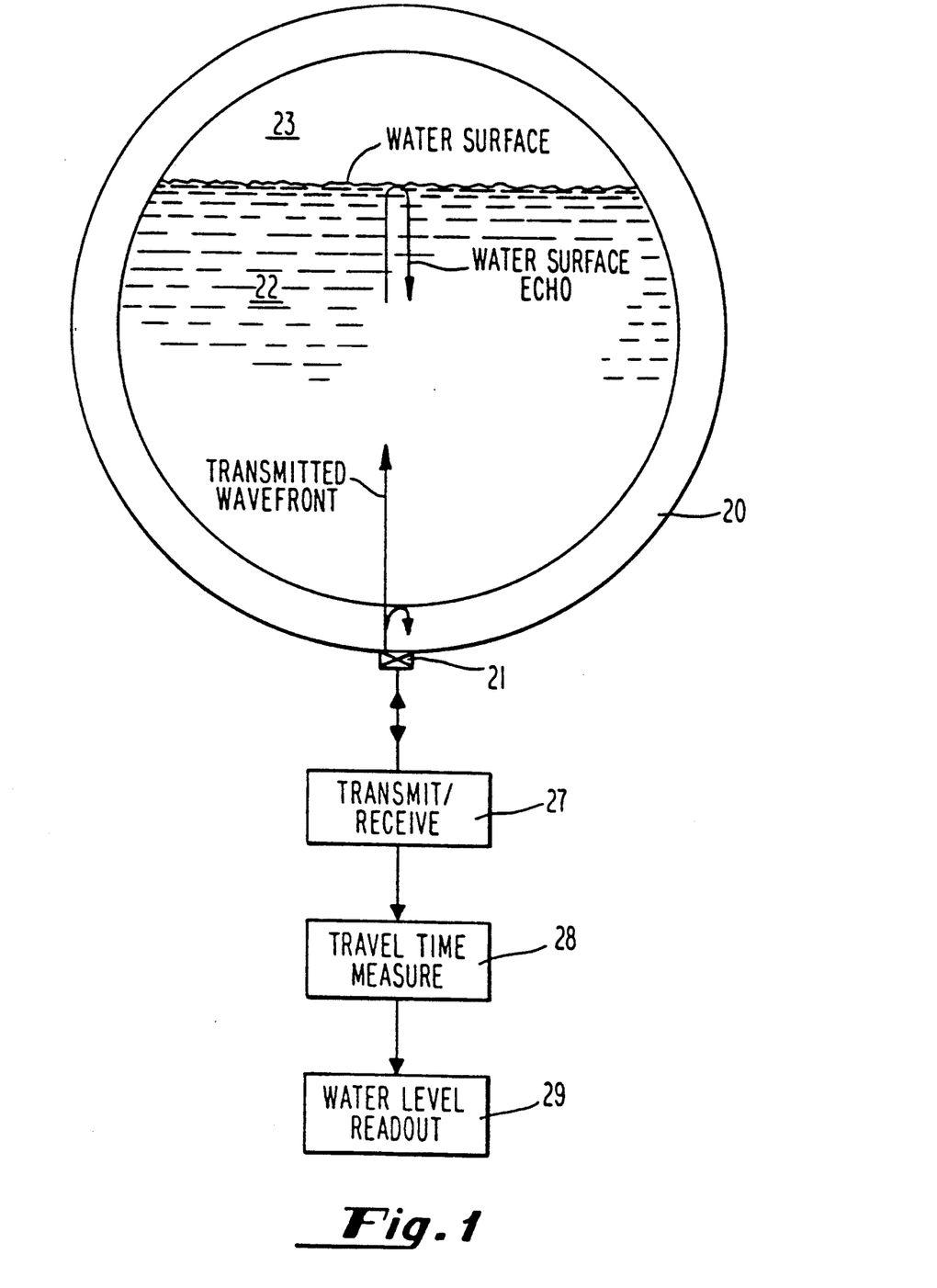
FIG. 1 is a schematic representation of a transducer mounted on a pipe such as a large main coolant pipe in a nuclear power plant, for measuring water level therein, in accordance with this invention.

Referring now to FIG. 1, there is shown a schematic representation of a transducer 21 mounted on the outside of a reactor coolant pipe 20 in a nuclear power plant. The pipe 20 is typically made of stainless steel, being about 2.45 inches (6 cm) in thickness and having an inner diameter of about 29 inches (about 75 cm). The pipe is filled with water 22 to a water surface or level as indicated, there being air above the surface. The nominal range through which the water surface is expected to be found during residual heat removal operations is from a low of about 6 inches (about 15 cm) to a high of about 12 inches (about 30 cm) above the pipe center, but the range of level measurement is typically from 4 inches (about 10 cm) to full pipe.

In practice, transducer 21 is mounted on the bottom wall of pipe or vessel 20 and is energized by a pulse from transmit/receive unit 27, which also couples its output to travel time measure circuit 28 to commence timing of the pulse travel time. The resulting pulse wavefront propagates upward toward the liquid surface, although there is also an echo from the inner boundary of the pipe wall. The pulse wavefront is reflected from the water surface, returning to transducer 21, where the sensed signal is coupled to transmit/receive unit 27. Upon detection of the leading edge of the return pulse, time measurement in circuit 28 is stopped, and the net travel time is translated at readout device 29 to provide an indication of water level. While the preferred use of the subject invention is in the environment of an ultrasonic level measurement system in a nuclear power plant, it is to be understood that its application is not limited to that environment; e.g., other suitable environments include fossil fuel power plants, chemical plants, and nuclear materials processing facilities. The subject invention provides particular improvement for ultrasonic transducers capable of operation at very high and also very low temperatures, and thus is widely applicable to different industrial applications, such as flow measurement. It is also noted that the term "ultrasonic" as used herein refers to acoustic signals generally referred to as being in the ultrasonic frequency range, as well as acoustic signals which may be outside of the ultrasonic frequency range. Also, while the invention is illustrated for measuring liquid level in a pipe, it is applicable for any liquid holding container, e.g., a tank, vessel, etc., and for a variety of instrumentation purposes.

Figure 2:
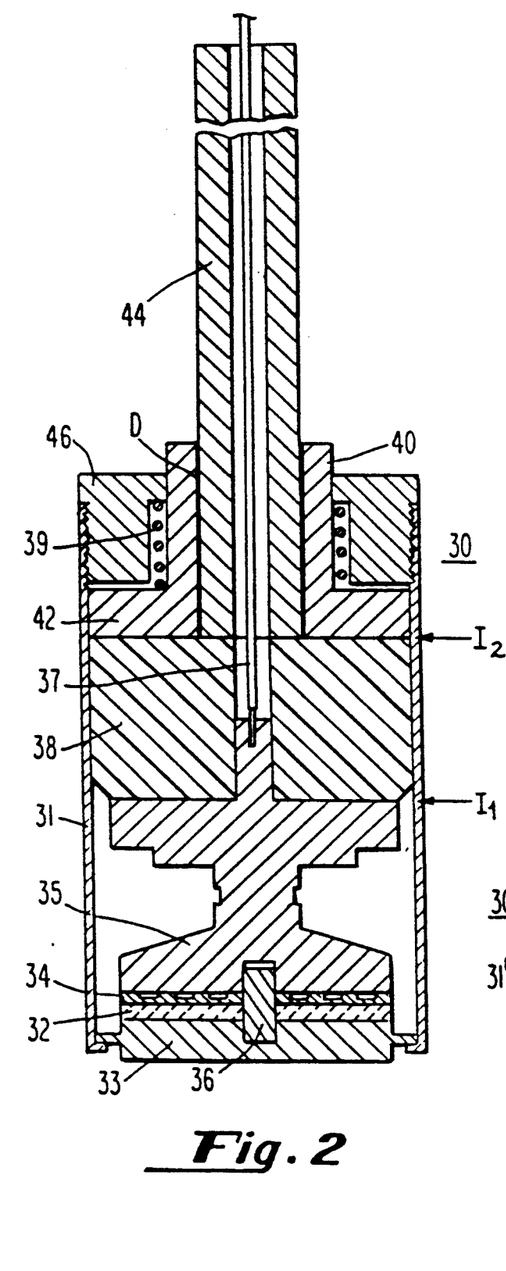
FIG. 2 is an assembly sketch of a dry-coupled ultrasonic transducer module utilizing a backing disc.

Referring now to FIG. 2, there is shown a design of a dry-coupled transducer assembly 30, useful for cast stainless steel pipe applications. As shown, the assembly is not hermetically sealed, as in the preferred embodiment, but is representative of a dry-coupled assembly for purposes of this specification. A transducer element 32, suitably a piezoelectric element, is shown within the assembly 30, which has an outer shell 31. The transducer element has a forward surface, which points downward as seen in FIG. 2, and a rearward or back surface, which is the upper surface as seen in FIG. 2. (In FIGS. 2–8, the transducer is shown inverted from its position if installed as in FIG. 1. A transducer can have any orientation, dependent upon the orientation of the mounting surface.) Positioned adjacent to the transducer forward surface is an acoustic window 33, of conventional material, which interfaces between the transducer element 32 and the pipe or other liquid-carrying element. The acoustic window is preferably a metal layer which retains and protects element 32, and acts as a medium for sound propagation to the external medium, e.g., a pipe wall. Positioned adjacent to the rear surface of transducer element 32 is a backing disc 34, designed to reduce reverberation within the remainder of the illustrated assembly. Just back of disc 34 is a rear contact 35, which delivers the coupling force and makes electrical contact. A lead wire 37 is brazed to rear contact 35 for conducting signals to and from the transducer element through contact 35. An insulating rod illustrated at 36 centers the transducer element and backing disc relative to the window and rear contact which have recesses to position the rod. Clearance shown at the rear end of the rod prevents the rod from receiving any of the externally applied force. In some designs, an insulating sleeve rather than a rod is used to center the element relative to adjacent parts, in which case the center holes in the transducer element and the backing disc, and the recesses in the window or rear contact, are not needed. A rod is preferred because a sleeve would tend to be thin in the radial direction, and hence fragile.

Proceeding rearwardly within assembly 30, there is illustrated an insulating spacer 38, which presses against the back surface of rear contact 35, thereby aligning it and transmitting coupling force to it. Rearward of spacer 38 is push rod 40, which is a brazed assembly of a flange and a hollow stem, but could be one piece. Coupling force is applied against the shoulder of the push rod, e.g., by disc springs 41, to push down, through the push rod, spacer, and rear contact, on the piezoelectric element and acoustic window, to provide a high compression contact against the pipe or other liquid-carrying element. The coupling force is not transmitted to the shell 31.

A coil spring 39 is held in place by a threaded cap 46, to apply a small force to keep internal parts snugly together in the absence of the strong external coupling force. The coil or other internal spring could possibly provide internal coupling force, but is not depended upon for this purpose. In the illustration of FIG. 2, a single backing disc 34 is shown, but it is to be understood that discs may also be mounted at the interfaces indicated at $I_1$ and $I_2$, on the forward and rearward sides respectively of the insulating spacer 38.

Figure 3:
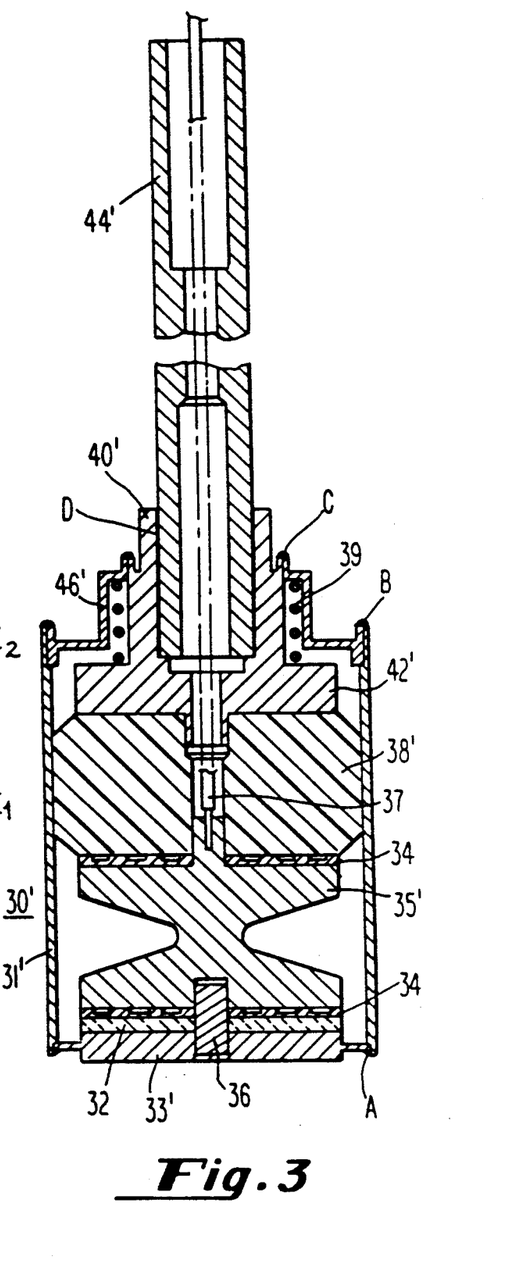
FIG. 3 is an assembly sketch of a hermetically sealed ultrasonic transducer module in accordance with the present invention.

FIG. 3 depicts a hermetically sealed ultrasonic transducer module 30'. Hermetic sealing is accomplished by welding, brazing, or soldering at locations A, B, and C; i.e., between window 33' and shell 31', between cap 46' and shell 31, and between cap 46' and push rod 40'. The thin peripheral flange of the window 33' provides compliance despite the greater tendency toward rigidity due to metallic joining (welding, brazing or soldering) at A, B and C; the thin flange also provides limited acoustic coupling to the shell, thus limiting one source of reverberation.

The first step in fabricating a sealed transducer module is to braze the window to the shell, which has a 1.250 inch (3.18 cm) outside diameter. All brazing of transducer parts is done in a vacuum furnace, using copper or a suitable alloy as a brazing material. The temperature uniformity in this process avoids distortion and possible misalignment of the window relative to the shell. The internal construction of module 30' is similar to that of module 30 shown in FIG. 2, but with some differences. One difference is that the insulating spacer 38' is the only part whose outer diameter matches the inner diameter of the shell 31', the outer diameter of push rod flange 42 having been reduced to one inch (2.54 cm), the same as for most other internal parts. Advantages of this change are that one less part has a critical outer diameter, and the shell can be reduced in diameter for compactness with only one internal part (insulating spacer 38') being affected. A small-diameter extension of the push rod flanged end fits a recess in insulating spacer 38' to align the push rod. The preferred shell outer diameter is 1.125 inches (about 2.86 cm), a size that allows a significant reduction in the size and weight of the holder (see FIG. 5).

The most significant changes are in the shape of the threaded cap 46' and the machining of the push rod 40' near weld point C. The cap now has a thin cross-section to provide compliance and is still threaded to allow repeated assembly and disassembly of the transducer to make changes, if necessary, as a result of testing prior to welding. The threaded cap also avoids a need for fixturing during welding. Prior to being welded at B and C, the assembly is a completely functioning non-sealed transducer module.

The coil spring 39 has no effect once the weld at C is made because it is trapped between two parts welded to each other; however, it is useful in that it ensures that internal parts are pressed together before welding and it transfers the stress to the cap 46' which pulls on the shell 31' to keep internal parts together after welding. This stress builds up as the cap is screwed on, compressing coil spring 39. Keeping internal parts together minimizes stress in the cap and shell as external force is applied because the parts do not move significantly. Two backing discs 34 reduce reverberation by reducing acoustic coupling into internal parts behind the transducer element 32. Both sides of acoustic window 33' and the front of transducer element 32 are lapped optically flat. The assembly of FIG. 2 could be hermetically sealed if metallically joined at points corresponding to A, B, and C in FIG. 3, but compliance would be lacking and high-heat welding would be required at the back end of the module. The engagement of window 33 and shell 31, however, is suitable for brazing.

Figure 4A:
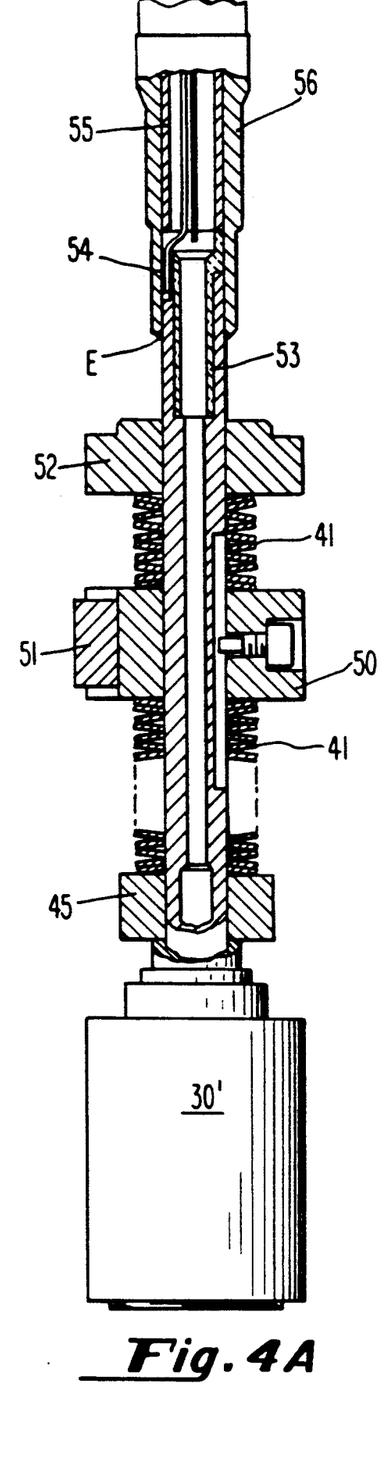
FIGS. 4A and 4B are an assembly sketch of a complete hermetically sealed ultrasonic transducer in accordance with the present invention.
Figure 4B:
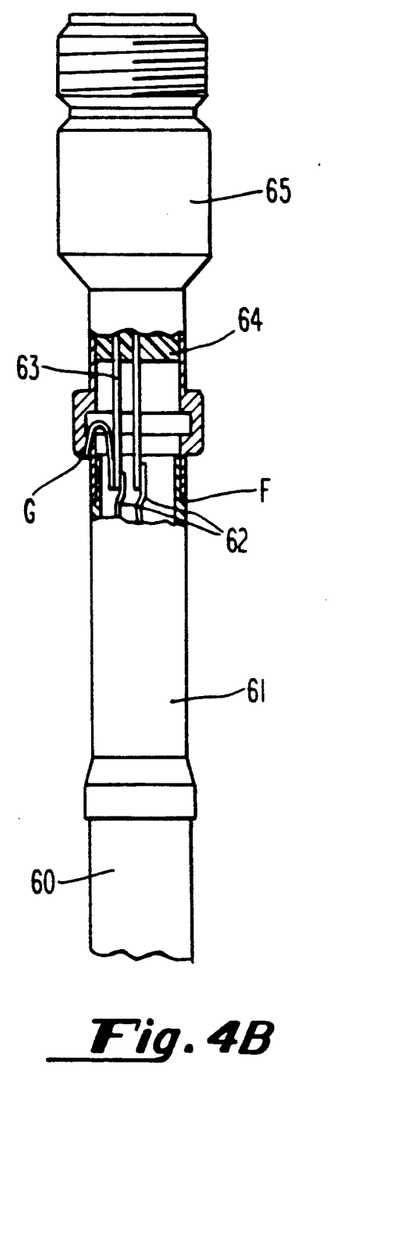

Referring now to FIGS. 4A and 4B, a complete hermetically sealed ultrasonic transducer includes a flexible sealed conduit 60 and a triaxial connector 65, which must be sealed at the module-to-conduit and conduit-to-connector interfaces, i.e., at points E and F. The front ferrule 56 of the conduit is TIG welded to the module stem at 54, however a ceramic sleeve 53 is first inserted to prevent weld heat from damaging the electrical insulation on the wires. A metal sleeve 55 occupies the additional length of the ferrule 56 to keep the ceramic sleeve 53 in place. In addition, before welding a ground wire is spot welded to the stem for later connection to the inner shield of the triaxial connector, as shown at 54.

The triaxial connector 65 is partially filled with epoxy 64 after wires are attached to the connector terminals, these connections (not shown) being made before the connector insert is snapped into the connector body from the back end. Use of a sealed connector or header (e.g., having glass to metal sealing) would eliminate the need for the epoxy. These wires are soldered to the wires from the transducer module and insulated with shrink tubing and glass braid sleeving before the connector is fitted to the conduit rear ferrule 61. The connector, after electrical connections are made, is soldered to the rear ferrule 61. The large end of the connector is heat-sinked to avoid exceeding the insulation temperature limit. Soldering is used because of dissimilar metals and lower expected temperatures at the connector during use of the transducer. Welding could be used if the materials were suitable. A wire 63 from the inner shield terminal is brought out through a small hole in the connector body and soldered at G, thereby providing a second ground connection and a seal.

The stack of parts from front spacer 45 to rear spacer 52 (inclusive) are installed on the stem before the conduit is welded to the module. The front spacer 45 adapts diameters between the disc springs 41 and the shoulder of the push rod 40' (40' is shown in FIG. 3). The keyed spacer 50 prevents transducer rotation and possible marring of coupling surfaces as the holder cap 69 (see FIG. 5) is rotated. The rear spacer 52 adapts to the inside diameter of the holder cap and compresses the disc springs 41. The springs are divided into two stacks to allow the hardened springs to accommodate any rotation of front and rear spacers 45, 52 relative to the keyed spacer 50. At each end of each stack, a pair of springs is nested, which doubles their spring constant and maintains compliance in the event that individual springs become fully compressed.

Figure 5:
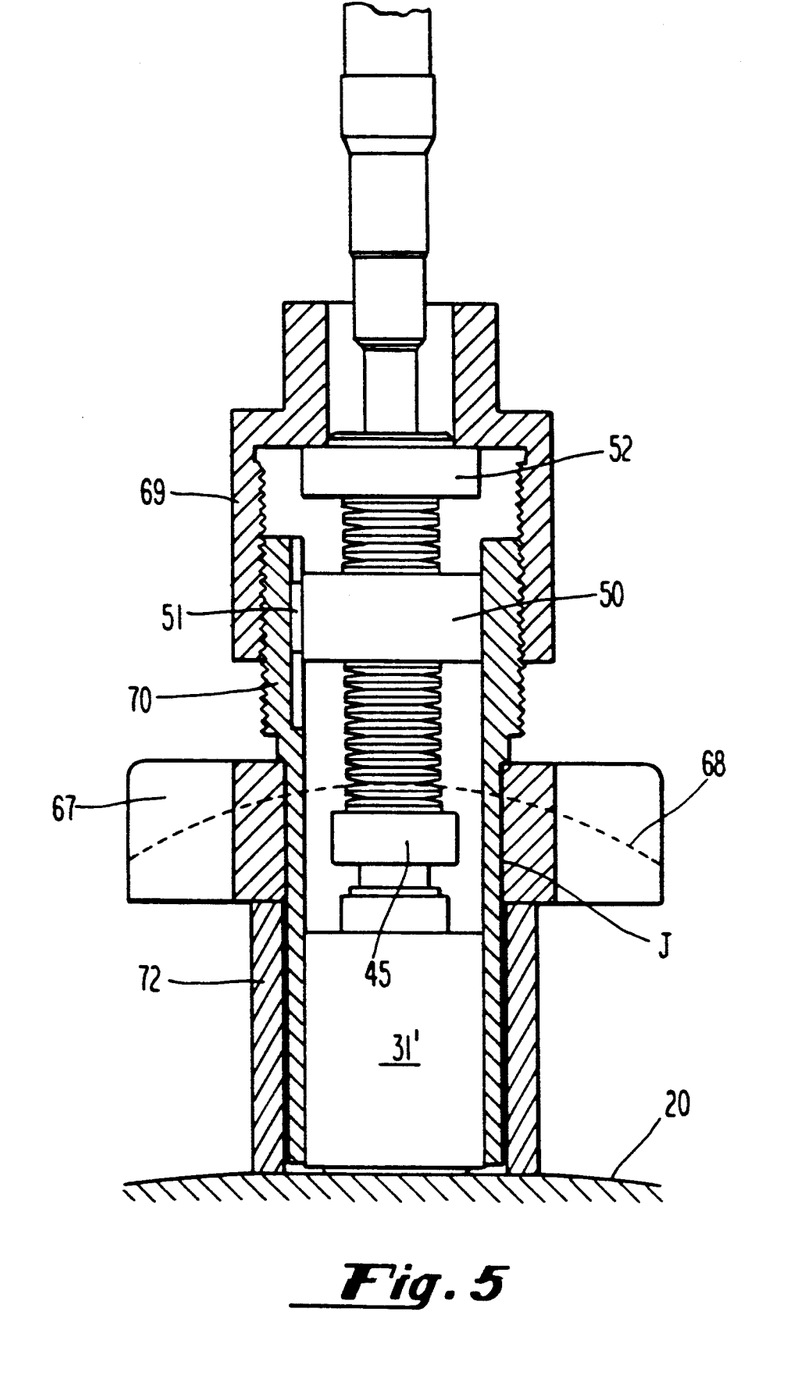
FIG. 5 depicts a hermetically sealed transducer installed in a holder on a pipe.

FIG. 5 shows a transducer module (actually only outer shell 31' and rear protrusions can be seen) installed in a holder as seen (except for being inverted) when mounted on a pipe 20. A coupling force, produced by turning the threaded holder cap 69, is applied through the disc springs which slide on the stem and push on the flanged end of the push rod. The holder further includes a holder tube 70, holder plate 67, and holder support 72. Dashed line 68 represents the surface where metal bands are used for mounting the holder to the pipe 20. Extensions of plate 67 into and out of the plane of the figure accommodate the bands.

Figure 6:
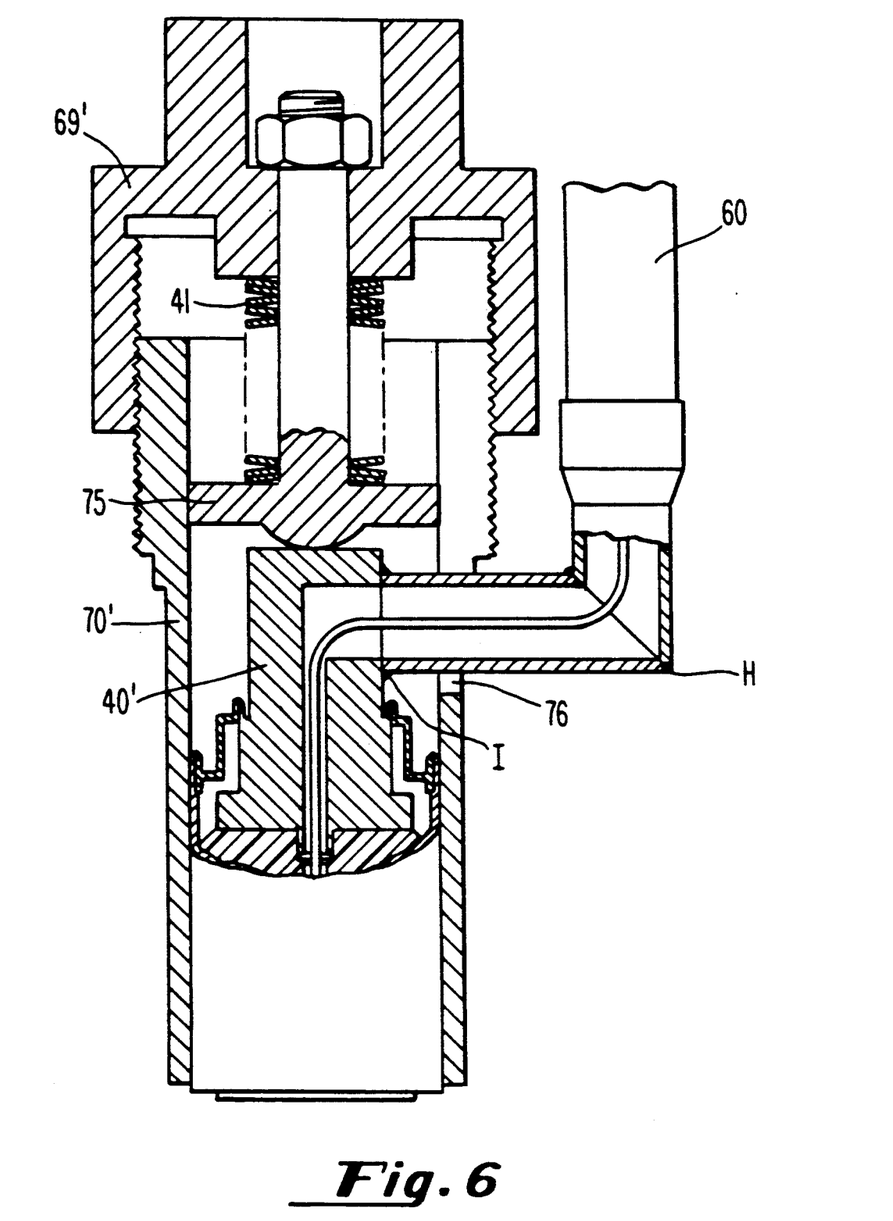
FIG. 6 depicts an alternative embodiment of a hermetically sealed ultrasonic transducer assembly in accordance with the present invention.

FIG. 6 depicts a hermetically sealed transducer having an offset flexible conduit installed in a special holder. With this arrangement, the springs are made part of the holder assembly and can be readily changed if a different force or spring travel is necessary. In addition, the module is more compact, and the lateral conduit extension passing through a slot in the holder body 70' serves to prevent transducer rotation. FIG. 6 shows a holder 70', 69' similar to the embodiment shown in FIG. 5, but with a different arrangement for applying coupling force, i.e., by use of plunger 75 to press down on push rod 40'. Note that, because the transducer module is a rugged sealed unit, it need not be completely enclosed by the holder.

Figure 7:
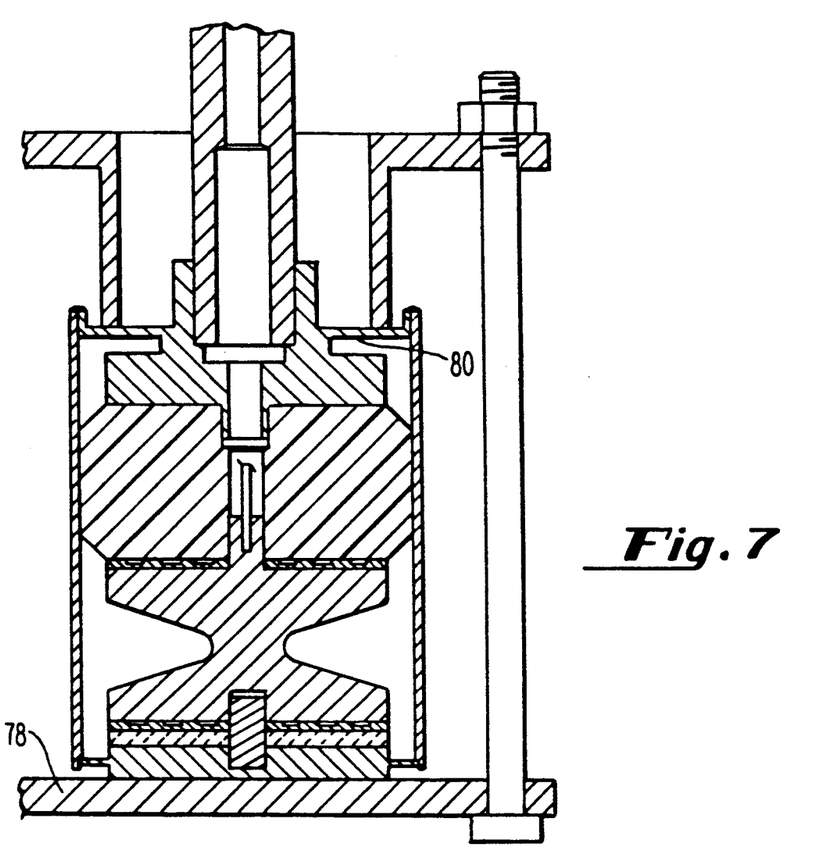
FIG. 7 depicts another alternative embodiment of a hermetically sealed ultrasonic transducer module in accordance with the present invention.

The threads on cap 46' and shell 31' (see FIG. 3) can be eliminated, and these parts held in position for welding by means of a fixture 78, if testing of the module before welding is found to be unnecessary, as shown in FIG. 7. This design change reduces machining and fabrication costs. Force for holding internal parts together is generated by causing the fixture to slightly bend the outer edge 80 of the cap during welding. The cap in this case is integral with the push rod flange.

Figure 8:
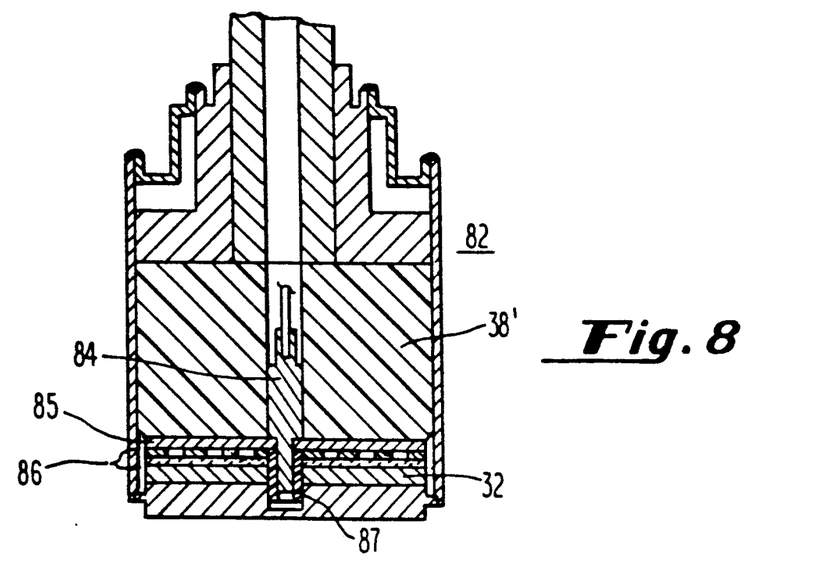
FIG. 8 depicts yet another embodiment of a hermetically sealed ultrasonic transducer module in accordance with the present invention.

A compact transducer module 82 is depicted in FIG. 8. In this design, the rear contact 85 is reduced to a thin disc, thus shortening the module and reducing the volume of metal in which reverberation can take place. Because there is no space in the thin rear contact 85 for the hole which aligns and retains the insulating rod in other designs (i.e., the designs of FIGS. 2 and 3), a threaded pin 84 supports a small insulating tube 87 that aligns the element and provides an attachment point for the lead wire. Threads (not shown) on the smaller-diameter end of the pin mate with threads in the rear contact 85. The threaded pin 84 may be integral with or brazed to the thin rear contact 85, and the insulating spacer 38' may be made shorter then shown in FIG. 8, with a corresponding reduction in the module's overall length. Backing discs 86 are shown behind the transducer element 32.

There are several additional points regarding the preferred embodiments that should be noted:

The complete transducer need not include a flexible conduit as shown in FIGS. 4A, 4B, 5 and 6. A rigid extension may be used or a connector may be mounted at the end of the module stem provided operating temperatures are not excessive for the connector used. The flexible sealed conduit is used to place the connector in a lower temperature region away from the potentially hot pipe or vessel.

In addition, note that the necked-down shape of rear contact 35, 35' is intended to limit ultrasonic energy propagation into rearward parts. It also tends to concentrate force nearer the center of the transducer element 32 and window 33, 33'. This effect tends to counter the tendency of compressive stress to be concentrated more around the periphery of the window where it meets the mounting surface on the pipe. On the other hand, with backing discs 34 energy flow to rearward parts may be sufficiently reduced without the necked down shape of the contact. Other shapes of the contact, such as a simple cylinder, may be use. An extreme example of this latter shape is shown in FIG. 8.

The inner shield 63 of the triaxial connector 65 is connected to the body and outer shield because one side of the transducer element is common to the external metal parts including the body (see FIG. 4B). The inner shield of the cable is isolated at the other end of the triaxial cable. In some cases, a coaxial connector (which would not have an inner shield needing a connection) would be adequate.

Weld joints B and C (see FIG. 3) are designed for low heat TIG welding. This is important because it minimizes distortion and avoids overheating the piezoelectric transducer element 32, which could destroy its function. The threaded cap 46, 46' is designed so that both weld joints B and C are aligned at the same time. These are seal welds, rather than strength welds, because the threaded cap provides much strength. The welds can be easily machined off if a change of internal parts is desired.

Insulating spacer 38, 38' and insulating rod 36 are typically made of a ceramic, particularly a machinable ceramic, for high temperature use. Otherwise they may also be made of any suitable insulating material.

Another possible embodiment (not shown) employs a compression type tube fitting (e.g., a Swagelock fitting) to join the module stem 44, 44' to the flexible conduit or other connector assembly. All sealing operations (welding, etc.) would be done on the transducer module and the connector assembly, then the final step would be to insert tubular ends into the fitting and tighten. The electrical connection would be made (possibly by using a simple single wire connector pair) just before applying the fitting. This is a potentially advantageous arrangement because the length of the flexible conduit is different for different installations; use of the fitting would allow the conduit and connector assembly of the correct length to be attached when needed. Very long lengths could even be installed at the user's site.

Transducers as described may have any diameter and any operating frequency, as determined by transducer element thickness. A specific smaller transducer (not shown) (e.g., for forged pipe) would have an outside diameter of about 0.75 in. (1.9 cm.), as compared to 1.25 in. (3.2 cm.) for the cast pipe transducer described above. Corresponding parts would also have to be modified accordingly.

With regard to terminology, the term "transducer element" as used herein refers to the piezoelectric wafer. "Transducer module" refers to the front assembly as in FIG. 3, complete and testable except for the connector and related parts. It is not completely sealed until the connector items are added. "Transducer" refers to the complete assembly, as shown in FIGS. 4A and 4B when taken together.

The various embodiments described above have one common feature—the transducer module is hermetically sealed, improving its reliability and longevity, in a manner that maintains the necessary compliance for coupling and minimizes reverberation. It is to be noted that while the invention has been illustrated in the context of the ULMS application, it is not limited to such liquid level applications. The invention may, for example, be used on a solid object for flaw detection, or any other purpose related to detecting the position of a surface in an element which is reflective of acoustic pulses. The invention may also be used in a passive acoustic emission mode.

I claim:

1. A hermetically sealed, dry-coupled transducer system for measuring liquid level in a liquid carrying container, said system comprising:
    a shell having at least a forward aperture;
    an acoustic window covering and forming a hermetic seal of said forward aperture;
    a transducer element, disposed inside said shell adjacent said acoustic window, having front and back surfaces and positioned to transmit acoustic signals from said front surface, through said acoustic window, to said container, and to receive reflections back from a liquid level in said container, the time between transmitting and receiving being indicative of said liquid level;
    insert means, positioned adjacent to said transducer back surface, for providing reflecting means for blocking acoustic transmissions from said transducer element from further rearward transmission;
    means for dry-coupling said transducer to said container and having a force means rearward of said transducer element to apply a force to the back surface of said transducer element, said coupling means comprising a flat solid member for exerting force against said transducer element back surface;
    wherein said shell further comprises a rearward aperture and said force means comprises a push rod; and
    wherein said coupling means further includes an insulating spacer situated between said push rod and said insert means, said insulating spacer has an outer diameter approximately equal to the inner diameter of said shell, and said insert means, transducer element, and push rod each have an outer diameter smaller than the inner diameter of said shell.

2. The system of claim 1, wherein said acoustic window includes a thin, flange-like periphery hermetically coupled to said shell, said thin periphery providing compliance to the window when the transducer element is installed in the shell.

3. The system of claim 1, wherein said reflecting means comprises spaced air gaps.

4. The system of claim 3, wherein said insert means comprises at least one disc positioned to transmit a force to said back surface, said disc having a plurality of recesses therein to provide said spaced air gaps.

5. The system of claim 1, wherein said insert means comprises a high compressive structure for transmitting coupling force over substantially all of the back surface of said transducer, said structure having voids therein arranged to minimize transmission of acoustic waves rearwardly.

6. The system of claim 1, further comprising thin, compliant, threaded cap means for repetitively coupling and uncoupling the push rod to and from the shell.

7. A hermetically sealed, dry-coupled transducer system for measuring the position of a reflective surface in a target element, said system having a shell with forward and rearward apertures, an acoustic window covering said forward aperture, a transducer element with forward and rear surfaces and positioned within said shell to transmit acoustic signals from said forward surface to said element and to receive reflections back therefrom, backing structure for dry-coupling mechanical force to hold said transducer in good acoustic contact with said element, and a disc assembly with holes positioned contiguous to said transducer back surface, said disc assembly providing substantially uniform transmission of mechanical force to said transducer rear surface and providing a plurality of air gaps configured so as to substantially block acoustic transmission from said transducer to the backing structure, said system comprising:

a hermetic seal at the junction of the window and the shell and a push rod enclosing the rearward aperture, said push rod comprising a push rod hermetically coupled to a thin, compliant, threaded cap, said cap providing means for repetitively coupling and uncoupling the push rod to and from the shell.

8. The transducer system as described in claim 7 wherein said element is a coolant pipe in a nuclear reactor power plant, and further comprising means for deriving from said received reflections and indication of liquid level in said pipe.

9. A hermetically sealed, dry-coupled transducer system for measuring the position of a reflective surface in a solid target element with a crack therein, said system having a shell with forward and rearward apertures, an acoustic window covering said forward aperture, a transducer element with forward and rear surfaces and positioned within said shell to transmit acoustic signals from said forward surface to said element and to receive reflections back therefrom, backing structure for dry-coupling mechanical force to hold said transducer in good acoustic contact with said element, and a disc assembly positioned contiguous to said transducer back surface, said disc assembly providing substantially uniform transmission of mechanical force to said transducer rear surface and providing a plurality of air gaps configured so as to substantially block acoustic transmission from said transducer to the backing structure, said system comprising:

a hermetic seal at the junction of the window and the shell and a push rod enclosing the rearward aperture, said push rod comprising a push rod hermetically coupled to a thin, compliant, threaded cap, said cap providing means for repetitively coupling and uncoupling the push rod to and from the shell; and means for deriving from said received reflections and indication of the position of said crack.

* * * * *